United States Patent
Kim et al.

(10) Patent No.: US 9,239,466 B2
(45) Date of Patent: Jan. 19, 2016

(54) POLARIZATION GLASSES TYPE STEREOSCOPIC IMAGE DISPLAY

(71) Applicant: LG Display Co., Ltd., Chicago, IL (US)

(72) Inventors: Jinyeong Kim, Paju-si (KR); Heeyoung Chae, Paju-si (KR); Juun Park, Paju-si (KR); Sungpil Ryu, Paju-si (KR); Meeran Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 621 days.

(21) Appl. No.: 13/658,994

(22) Filed: Oct. 24, 2012

(65) Prior Publication Data

US 2013/0155504 A1 Jun. 20, 2013

(30) Foreign Application Priority Data

Dec. 15, 2011 (KR) .................. 10-2011-0135804
Apr. 18, 2012 (KR) .................. 10-2012-0040271
Jul. 5, 2012 (KR) .................. 10-2012-0073265

(51) Int. Cl.
*G02F 1/1335* (2006.01)
*G02B 27/22* (2006.01)
*G02B 27/26* (2006.01)
*H04N 13/04* (2006.01)

(52) U.S. Cl.
CPC ............ *G02B 27/26* (2013.01); *G02B 27/2214* (2013.01); *H04N 13/0422* (2013.01); *H04N 13/0434* (2013.01)

(58) Field of Classification Search
CPC .................. G02F 1/133528; G02F 1/133536; G02B 27/2214; G02B 27/26; G02B 5/3033; G02B 27/2264; H04N 13/0404; H04N 13/0403; H04N 13/0409; H04N 13/0497; H04N 13/0438; H04N 13/0434
USPC .............................. 349/15, 96; 359/464, 465
See application file for complete search history.

(56) References Cited

U.S. PATENT DOCUMENTS

2013/0027773 A1* 1/2013 Segawa .................. 359/465
2013/0063687 A1* 3/2013 Jang et al. .................. 349/106

FOREIGN PATENT DOCUMENTS

| JP | 2003295115 A | * | 10/2003 | ............ G02B 27/22 |
| JP | 2010096900 A | * | 4/2010 | |
| JP | 2011048286 A | * | 3/2011 | |
| JP | 2011180559 A | * | 9/2011 | |

* cited by examiner

*Primary Examiner* — Mike Qi
(74) *Attorney, Agent, or Firm* — Brinks Gilson & Lione

(57) ABSTRACT

A polarization glasses type stereoscopic image display displaying a stereoscopic image on a display surface includes a thin film transistor array substrate, a color filter array substrate having a plurality of black matrix patterns formed on a first plane facing the thin film transistor array substrate, a plurality of black stripe patterns that are aligned correspondingly to the black matrix patterns on a second plane of the color filter array substrate opposite to the first plane, and a patterned retarder disposed over the second plane of the color filter array substrate. The overall vertical pitch of the patterned retarder is less than the overall vertical pitch of a pixel array formed on the display surface.

13 Claims, 21 Drawing Sheets

POLARIZATION GLASSES TYPE STEREOSCOPIC IMAGE DISPLAY

This application claims the benefit of Korean Patent Application No. 10-2011-0135804 filed on Dec. 15, 2011, and Korean Patent Application No. 10-2012-0040271 filed on Apr. 18, 2012, and Korean Patent Application No. 10-2012-0073265 filed on Jul. 5, 2012, which are incorporated herein by reference for all purposes as if fully set forth herein.

BACKGROUND

1. Field of the Invention

Embodiments of the disclosure relate to a stereoscopic image display, and more particularly, to a polarization glasses type stereoscopic image display capable of improving a vertical viewing angle of a stereoscopic image.

2. Discussion of the Related Art

A stereoscopic image display displays a stereoscopic image by using a stereoscopic technique or an autostereoscopic technique.

The stereoscopic technique, which uses a binocular parallax image between left and right eyes of a user and has a high stereoscopic effect, includes a glass method and a non-glass method which have been put to practical use. In the glass method, the binocular parallax image is displayed on a direct view-based display device or a projector by changing a polarization direction or in a time division manner, and polarization glasses or liquid crystal shutter glasses are used to implement stereoscopic images. In the non-glass method, generally, an optical plate such as a parallax barrier or the like for separating an optical axis of the binocular parallax image is provided at the front surface or rear surface of a display screen.

FIG. 1 is a view showing a related art polarization glasses type stereoscopic image display.

Referring to FIG. 1, the glasses type stereoscopic image display 1 comprises a display panel and a patterned retarder 17 bonded to the display panel.

The display panel comprises a thin film transistor array substrate 10, a color filter substrate 12 comprising color filters 13 and a black matrix 14, and a liquid crystal layer 15 formed between the thin film transistor array substrate 10 and the color filter substrate 12, a second polarizing plate 16b attached to the bottom of the thin film transistor array substrate 10, and a first polarizing plate 16a attached to the top of the color filter substrate 12.

The patterned retarder 17 comprises a first retarder pattern for selectively transmitting only first polarized light and a second retarder pattern for selectively transmitting only second polarized light, and is attached on the first polarizing plate 16a. The first retarder pattern and the second retarder pattern are formed alternately line by line, and a surface-treated protective film 18 may be attached on the patterned retarder 17.

The stereoscopic image display 1 of this type alternately displays a left image and a right image and switches polarization characteristics incident to polarization glasses via the patterned retarder 17. Thereby, the glasses type can implement stereoscopic images by spatially dividing left images and right images.

The polarization glasses type stereoscopic image display may suffer 3D crosstalk depending on a viewing position when displaying a stereoscopic image. 3D crosstalk occurs when a left-eye image and a right-eye image are seen overlapping each other by a single eye (left-eye or right-eye). When viewing the display panel from the front, the left-eye image is transmitted and seen through the corresponding first retarder pattern alone, and the right-eye image is transmitted and seen through the corresponding second retarder pattern alone, whereby no 3D crosstalk is perceived. However, when viewing the display panel from a vertical direction, the left-eye image may be transmitted through the first retarder pattern and the second retarder pattern corresponding to the right-eye image and seen mixed with the right-eye image, and the right-eye image may be transmitted through the second retarder pattern and the first retarder pattern corresponding to the left-eye image and seen mixed with the left-eye image, whereby 3D crosstalk is perceived.

In general, a vertical viewing angle on a stereoscopic image display is defined as the sum of upper and lower viewing angles at which 3D crosstalk is perceived with a probability of 10% or less. The vertical viewing angle is closely related to the width of black matrices, the distance between the color filters and the patterned retarder, and so on. By increasing the width of black matrices, 3D crosstalk may be improved and vertical viewing angle may be widened, but aperture ratio and luminance may be lowered.

The related art polarization glasses type stereoscopic image display has attained a desired vertical viewing angle by increasing the width of black matrices in spite of low aperture ratio and luminance.

BRIEF SUMMARY

Embodiments of the invention provide a polarization glasses type stereoscopic image display, which can minimize a reduction in an aperture ratio and a luminance and widen a vertical viewing angle.

In one aspect, there is a polarization glasses type stereoscopic image display displaying a stereoscopic image on a display surface including a thin film transistor array substrate, a color filter array substrate having a plurality of black matrix patterns formed on a first plane facing the thin film transistor array substrate, a plurality of black stripe patterns that are aligned correspondingly to the black matrix patterns on a second plane of the color filter array substrate facing the first plane, and a patterned retarder disposed over the second plane of the color filter array substrate, wherein the vertical pitch of the patterned retarder is less than the vertical pitch of a pixel array formed on the display surface.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 2 to 28.

Figure 1:
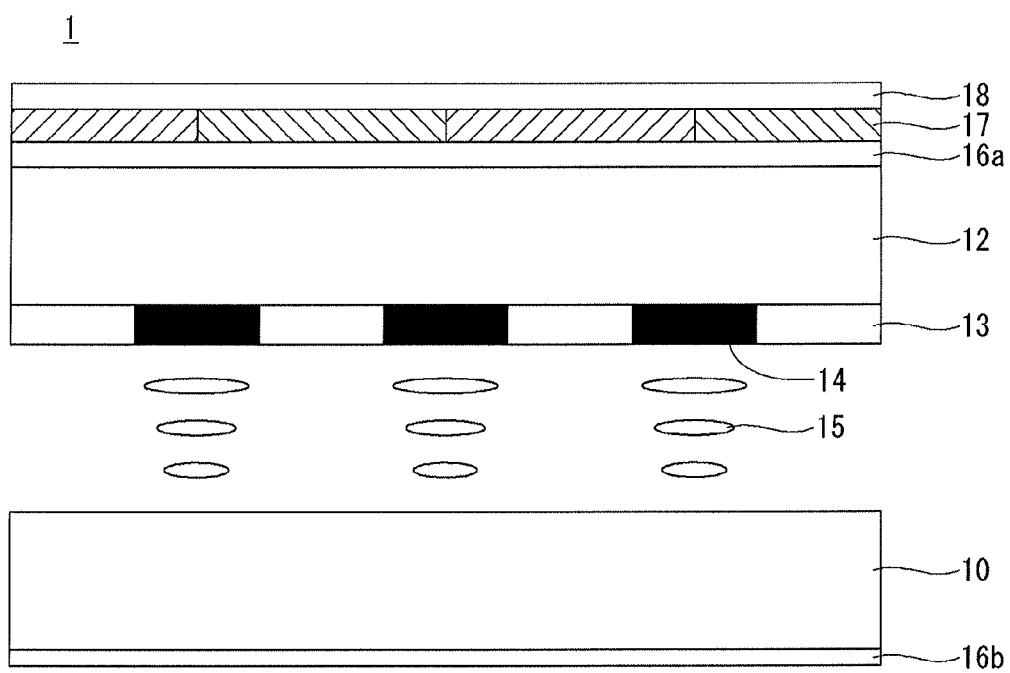
FIG. 1 is a view showing a related art polarization glasses type stereoscopic image display.
Figure 2:
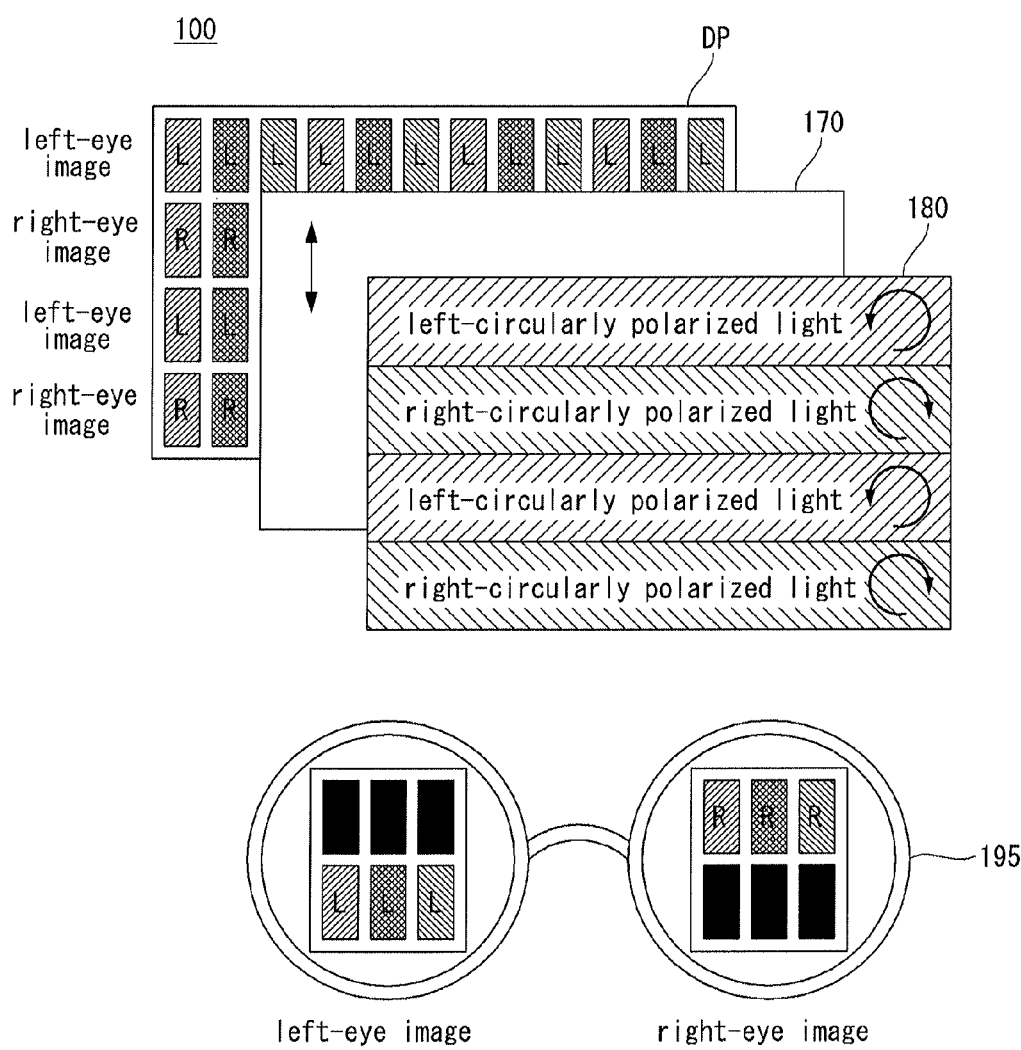
FIG. 2 is a view schematically showing a polarization glasses type stereoscopic image display according to the present invention.

FIG. 2 is a view schematically showing a polarization glasses type stereoscopic image display according to the present invention.

Referring to FIG. 2, the polarization glasses type stereoscopic image display 100 according to the present invention comprises a display panel DP, a patterned retarder 180, and polarization glasses 195.

The display panel DP may be, but not limited to, a liquid crystal display (LCD). The display panel DP may be a field emission display (FED), a plasma display panel (PDP), an organic light emitting diode (OLED), an electroluminescence device (EL), and so on.

When the display panel DP is implemented as a liquid crystal display panel, the stereoscopic image display 100 may further comprise a first polarizing plate 170 positioned between the display panel DP and the patterned retarder 180, a backlight unit (not shown) disposed under the display panel DP, and a second polarizing plate (not shown) disposed between the display panel DP and the backlight unit. The patterned retarder 180 and the polarization glasses 195 are stereoscopic image driving elements, which realize a binocular parallax by spatially dividing left images and right images.

The display panel DP has two glass substrates and a liquid crystal layer formed therebetween. A color filter array is formed on the first glass substrate, and a thin film transistor array is formed on the second glass substrate. The color filter array comprises a black matrix, color filters, etc. The first polarizing plate 170 is attached on the first glass substrate. Left-eye images L and right-eye images R are alternately displayed on the display panel DP in a line-by-line manner. The polarizing plate 170 transmits only a specific linearly polarized light out of incident light passed through the liquid crystal layer of the display panel DP.

The patterned retarder 180 is attached on the first polarizing plate 170 of the display panel DP. A first retarder pattern is formed at odd numbered lines of the patterned retarder 180, and a second retarder pattern is formed at even-numbered lines of the patterned retarder 180. The first retarder patterns is disposed to face lines for displaying a left-eye image L on the display panel DP, and the second retarder pattern is disposed to face lines for displaying a right-eye image R on the display panel DP. The optical absorption axis of the first retarder pattern and the optical absorption axis of the second retarder pattern are different from each other. The first retarder pattern delays the phase of linearly polarized light of the left-eye image L incident through the first polarizing plate 170 by ¼ wavelength to cause the incident light to pass as first polarized light (e.g., left-circularly polarized light). The second retarder pattern delays the phase of linearly polarized light of the right-eye image R incident through the first polarizing plate 170 by ¾ wavelength to cause the incident light to pass as second polarized light (e.g., right-circularly polarized light). The first retarder pattern may be implemented by a polarization filter for transmitting a left-circular polarization component and blocking a right-circular polarization component, and the second retarder pattern may be implemented by a polarization filter for transmitting the right-circular polarization component and blocking the left-circular polarization component.

A polarization film for allowing only the first polarization component to pass therethrough is bonded to the left-eye of the polarization glasses 195, and a polarization film for allowing only the second polarization component to pass therethrough is bonded to the right-eye of the polarization glasses 195. Therefore, a viewer wearing the polarization glasses 195 sees only a left-eye image L with the left eye and only a right-eye image R with the right eye, thus feeling that an image displayed on the display panel DP is a stereoscopic image.

Figure 3:
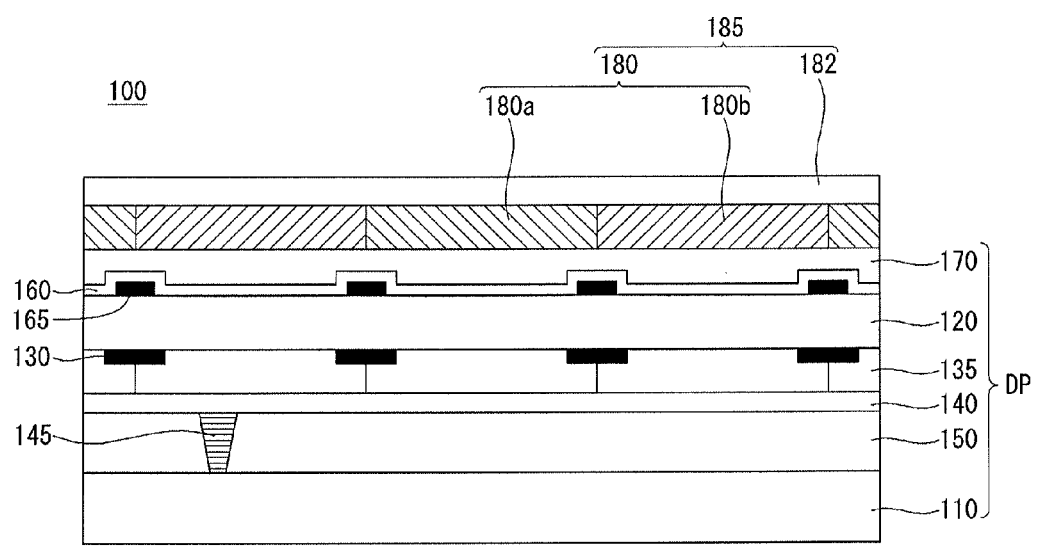
FIGS. 3 and 4 are views showing a stereoscopic image display having black matrices and black stripes formed corresponding each other according to an exemplary embodiment of the present invention.
Figure 4:
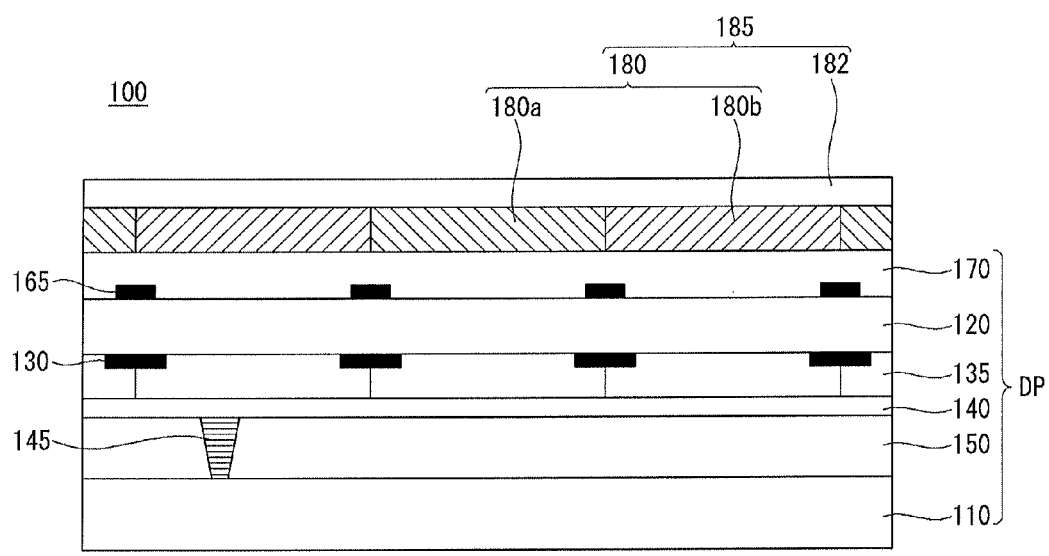

In the polarization glasses type stereoscopic image display 100 according to the present invention, black stripe patterns 165 aligned in a direction that is directed from an upper side of the display 100 to a lower side of the display 100 are formed at specific positions corresponding to black matrix patterns 130 between the display panel DP and the patterned retarder 180, as shown in FIGS. 3 and 4, in order to minimize decreases in aperture ratio and luminance and widen vertical viewing angle. The black stripe patterns 165 are aligned along the vertical direction from the top to the bottom of the display panel DP.

To minimize decreases in luminance uniformity depending on a viewing angle when the black stripes patterns 165 are formed as described above, the polarization glasses type stereoscopic image display 100 according to the present invention may be designed such that the width of the black stripe patterns 165 is relatively large at the center part of the display panel DP and relatively small at the upper and lower parts of the display panel DP, as shown in FIGS. 9, 11, 24, and 25.

To achieve a sufficient vertical viewing angle when the black stripe patterns 165 are formed as described above, the polarization glasses type stereoscopic image display 100 according to the present invention may be designed such that the width of the black stripe patterns 165 is relatively small at the center portion of the display panel DP and relatively large at the upper and lower portions of the display panel DP.

To wide vertical viewing angle and minimize decreases in luminance uniformity depending on the viewing angle when the black stripe patterns 165 are formed as described above, the polarization glasses type stereoscopic image display 100 according to the present invention may be designed such that the width of the black stripe patterns 165 is uniform at the center block of the display panel DP corresponding to a luminance uniformity measurement range and gradually varies at the upper and lower blocks of the display panel DP. In the present invention, the upper portion, the upper block, the center portion, the center block, the lower portion, and the lower block are defined along the vertical direction from the top to the bottom of the display panel DP.

This will be described in detail below. Hereinafter, the same components as FIG. 2 will be assigned the same reference numerals as FIG. 2, and their explanations will be simplified.

Figure 5:
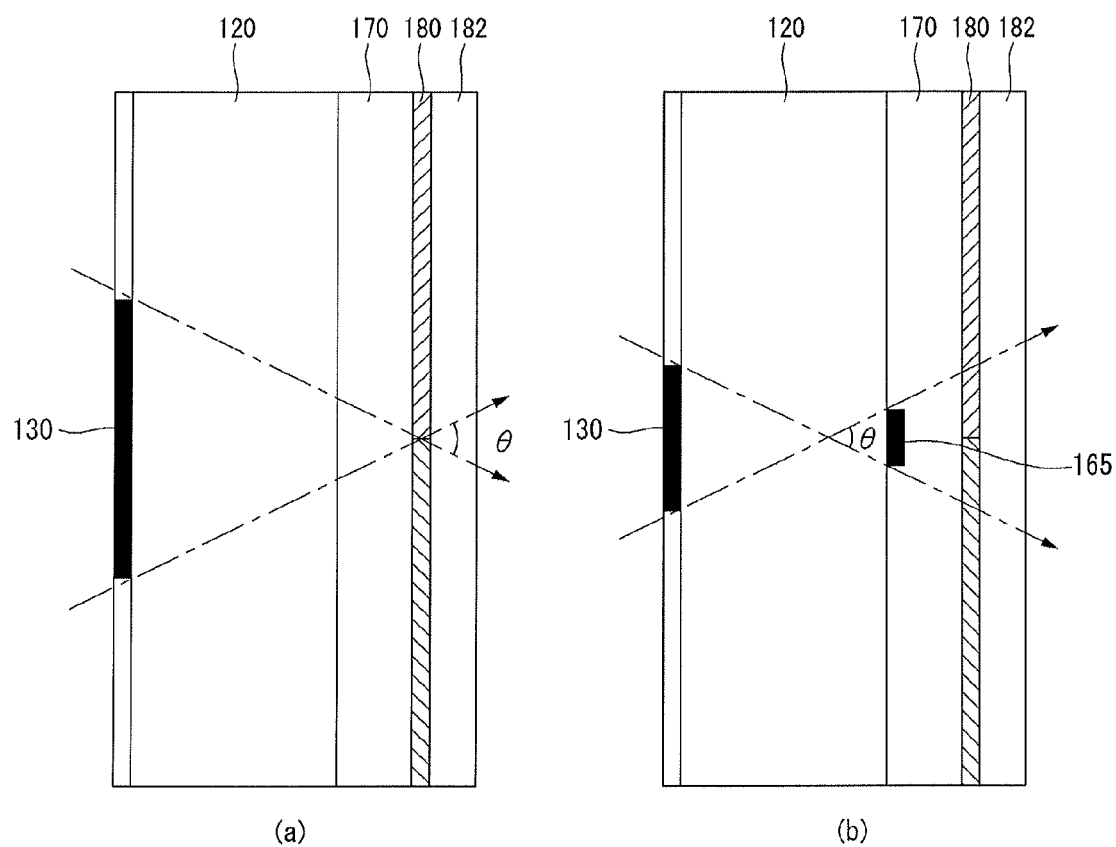
FIG. 5 illustrates that the vertical viewing angle is widened, compared to the related art, by the minimization of decreases in aperture ratio and luminance according to the present invention.
Figure 6:
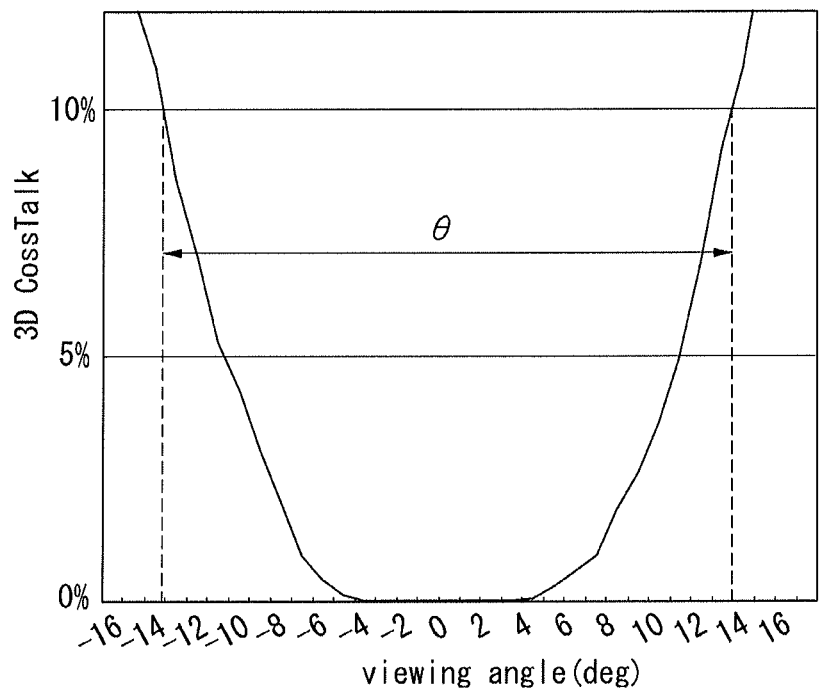
FIG. 6 is a view showing an example of a widened vertical viewing angle according to the present invention.

FIGS. 3 and 4 are views showing a stereoscopic image display having black matrices and black stripes formed corresponding each other according to an exemplary embodiment of the present invention. FIG. 5 illustrates that the vertical viewing angle is widened, compared to the related art, by the minimization of decreases in aperture ratio and luminance according to the present invention. FIG. 6 is a view showing an example of a widened vertical viewing angle according to the present invention.

Referring to FIGS. 3 and 4, the stereoscopic image display 100 comprises a display panel DP having black stripe patterns 165 formed at specific positions corresponding to black matrix patterns 130 and a patterned retarder film 185 attached on the display panel DP.

The display panel DP comprises a thin film transistor array substrate 110, a color filter array substrate 120 facing the thin film transistor array substrate 110, and a liquid crystal layer 150 formed between these substrates 110 and 120. The thin film transistor array substrate 110 comprises a plurality of data lines supplied with R, G, and B data voltages, a plurality of gate lines which intersect the data lines and are sequentially supplied with gate pulses, a plurality of thin film transistors formed at the intersections of the data lines and the gate lines, a plurality of pixel electrodes for charging data voltages in liquid crystal cells, and a storage capacitor connected to the pixel electrodes to maintain the voltages of the liquid crystal cells.

Common electrodes facing the pixel electrodes to form an electric field are disposed on the color filter array substrate 120 in a vertical electric field driving type such as a TN (twisted nematic) mode and a VA (vertical alignment) mode, and are disposed on the thin film transistor array substrate 110 along with the pixel electrodes in a horizontal electric field type such as an IPS (in plane switching) mode and an FFS (fringe field switching) mode.

Color filters 135, black matrix patterns 130, and an overcoat layer 140 are formed on the color filter array substrate 120. The color filters 135 convert light emitted from the backlight unit and transmitted through the liquid crystal layer 150 into red, green, and blue. The black matrix patterns 130 shield light between neighboring color filters 135 to prevent optical interference between the color filters 135. The overcoat layer 140 protects the color filters 135 and the black matrix patterns 130.

In the thin film transistor array substrate 110 and the color filter array substrate 120, alignment layers for setting a pre-tilt angle of liquid crystals are respectively formed on the inner surfaces contacting the liquid crystal layer 150, and a column spacer 145 for keeping a cell gap of the liquid crystal cells is formed.

The first polarizing plate 170 is attached on the rear surface of the color filter array substrate 130. The black stripe patterns 165 are formed at specific positions corresponding to the black matrix patterns 130 between the rear surface of the color filter array substrate 120 and the first polarizing plate 170. A rear metal layer (hereinafter, referred to as a 'rear ITO') 160 made of transparent metal may be further formed between the rear surface of the color filter array substrate 120 and the first polarizing plate 170 to discharge static electricity. In this case, as shown in FIG. 3, the black stripe patterns 165 may be formed between the rear surface of the color filter array substrate 120 and the rear ITO 160. Like the black matrix patterns 130, the black stripe patterns 165 are formed of an opaque/non-transmissive material. When the black stripe patterns 165 are formed of opaque resin, the rigidity of the black stripe patterns 165 is lower than that of the rear ITO 160. Accordingly, the rear ITO 160 functions as a protective film for protecting the black stripe patterns 165, in addition to functioning to discharge static electricity. That is, the rear ITO 160 is formed to cover the black stripe patterns 165, as shown in FIG. 3, thereby preventing loss of the black stripe patterns 165 in a subsequent washing process, etc.

On the other hand, as shown in FIG. 4, the black stripe patterns 165 may be in direct contact with the first polarizing plate 170, without being protected by the rear ITO 160, on the rear surface of the color filter array substrate 120. In this case, the black stripe patterns 165 may be formed of opaque metal to achieve sufficient rigidity for preventing loss in the subsequent washing process, etc. and to discharge static electricity generated upon attachment of the first polarizing plate 170.

If the rear ITO 160 is formed of opaque metal, as shown in FIG. 3, the black stripe patterns 165 may be formed between the rear ITO 160 and the first polarizing plate 170.

To minimize decreases in luminance, the black stripe patterns 165 in FIGS. 3 and 4 may overlap with the black matrix patterns 130 within the areas corresponding to the black matrix patterns 130.

The patterned retarder film 185 comprises a patterned retarder 180 attached on the first polarizing plate 170 and a protective film 182 for protecting the patterned retarder 180. The patterned retarder 180 comprises a first retarder pattern 180a and a second retarder pattern 180b which are patterned line by line, the functions of which are as described above.

Since the related art stereoscopic image display shown in (a) of FIG. 5 has no particular black stripe patterns, it is necessary to make the width of the black matrix patterns 130 large enough to achieve a desired vertical viewing angle (θ).

On the contrary, the stereoscopic image display according to an exemplary embodiment of the present invention shown in (b) of FIG. 5 renders the width of the black matrix patterns 130 smaller than that of the related art and achieves a vertical viewing angle (θ) similar to that of the related art by forming the black stripe patterns 165 at the corresponding positions of the black matrix patterns 130. Assuming that a vertical viewing angle is defined as the sum of upper and lower viewing angles at which 3D crosstalk is perceived with a probability of 10% or less, the present invention can minimize decreases in aperture ratio and luminance and widen vertical viewing angle to approximately 27.5 degrees as shown in FIG. 6.

As discussed above, the related art stereoscopic image display increased the width of black matrix patterns in order to widen vertical viewing angle; whereas an exemplary embodiment of the present invention has the advantage of realizing the same vertical viewing angle as the related art and preventing decreases in aperture and luminance by forming black matrix patterns on the first plane of the color filter array substrate to be narrower compared to the related art and forming black stripes on the second plane of the color filter array substrate, opposite to the first plane, to overlap with the black matrix patterns.

Still, according to an exemplary embodiment of the present invention, partial decrease in luminance may occur depending on the viewing angle.

Figure 7:
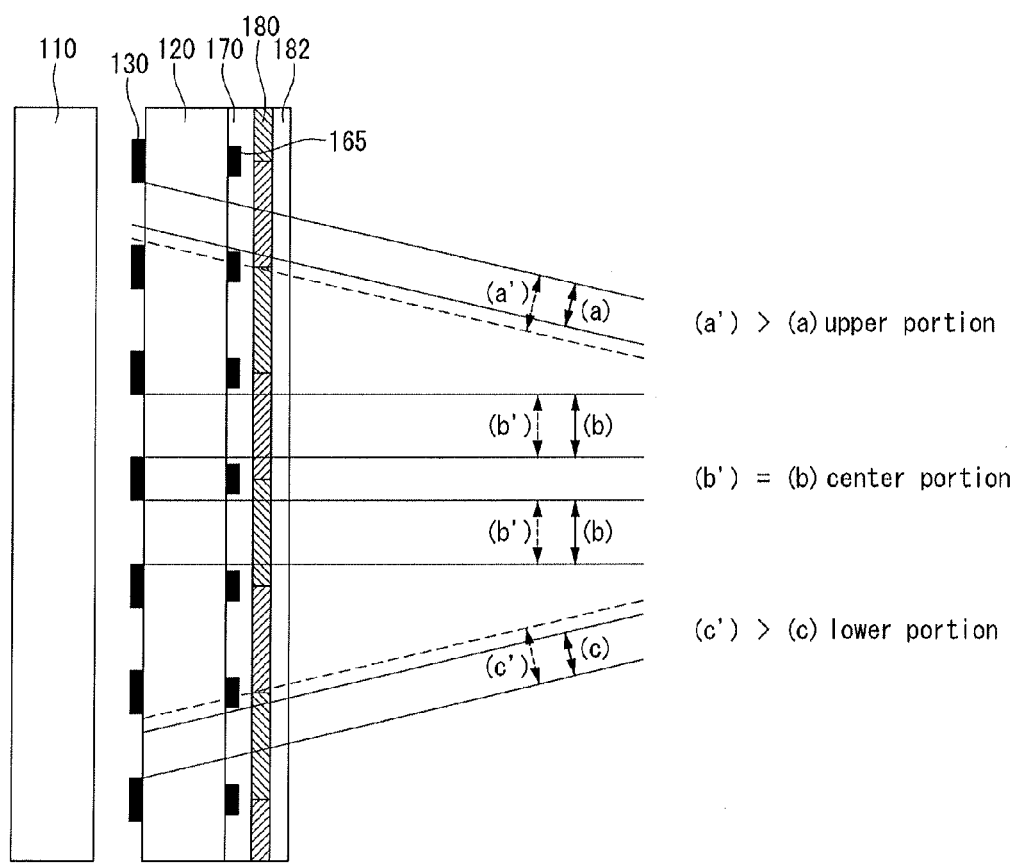
FIGS. 7 and 8 are views showing examples of partial decrease in luminance depending on a viewing angle.
Figure 8:
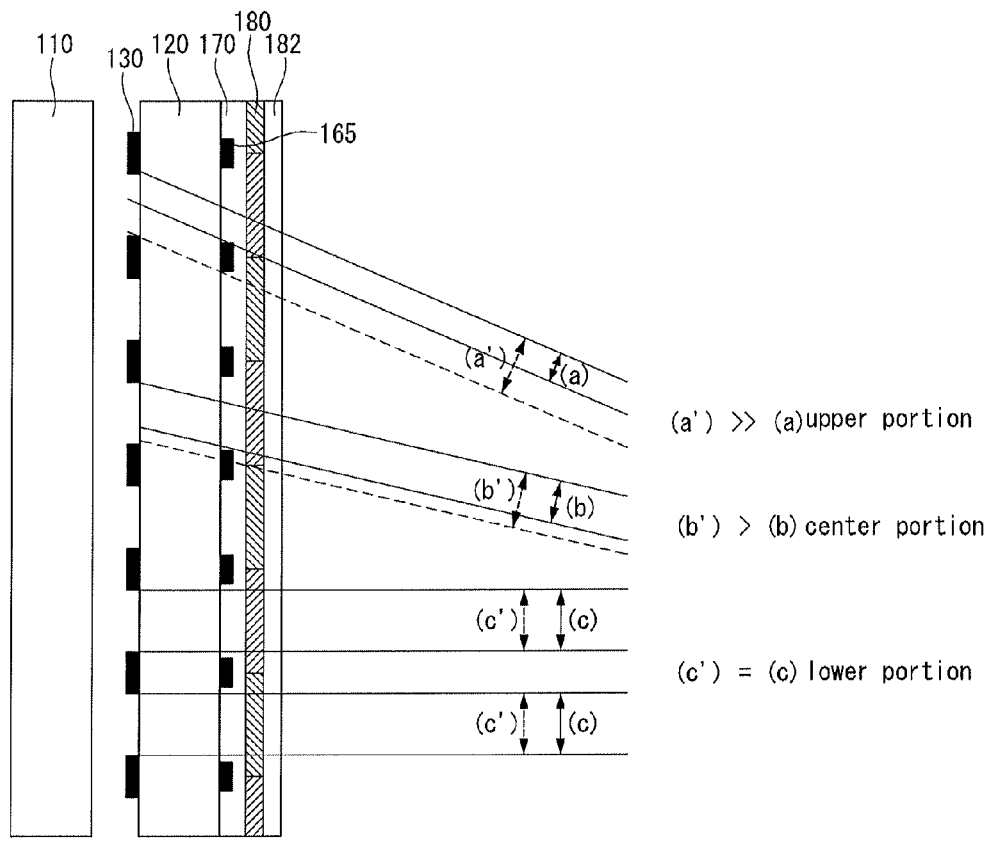

FIGS. 7 and 8 are views showing examples of partial decrease in luminance depending on a viewing angle. In FIGS. 7 and 8, (a'), (b'), and (c') are ideal viewing ranges of a viewer, and (a), (b), and (c) are actually available viewing ranges.

FIG. 7 is an example of the case in which a viewer views the stereoscopic image display, with his or her eyes set parallel to the center portion of the stereoscopic image display.

When the viewer views an image at the center portion of the stereoscopic image display, the viewing range of the viewer is not obscured by the black stripe patterns 165, as shown in FIG. 7. Accordingly, the viewer can view the image on the center portion without decrease in luminance. In this case, the ideal viewing range of the viewer (b') and the actually available viewing range (b) are identical.

On the other hand, when the viewer views an image at the upper portion of the stereoscopic image display, the viewing range of the viewer is obscured by the black stripe patterns 165, as shown in FIG. 7. In this case, the actually available viewing range (a) becomes narrower than the ideal viewing range of the viewer (a'). As a result, the viewer views the image at the upper portion with lowered luminance. Likewise, when the viewer views an image at the lower portion of the stereoscopic image display, the viewing range of the viewer is obscured by the black stripe patterns 165, and the actually available viewing range (c) becomes narrower than the ideal viewing range of the viewer (c'). As a result, the viewer views the image at the lower portion with lowered luminance.

FIG. 8 is an example of the case in which the viewer views the stereoscopic image display, with his or her eyes set parallel to the lower portion of the stereoscopic image display.

When the viewer views an image at the lower portion of the stereoscopic image display, the viewing range of the viewer is not obscured by the black stripe patterns 165, as shown in FIG. 8. In this case, the ideal viewing range of the viewer (c') and the actually available viewing range (c) are identical, and the viewer can view the image at the lower portion without decrease in luminance.

On the other hand, when the viewer views an image at the center portion of the stereoscopic image display, the viewing range of the viewer is obscured by the black stripe patterns 165. As a result, the actually available viewing range (b) becomes narrower than the ideal viewing range of the viewer (b'), thereby causing a luminance decrease. Moreover, when the viewer views an image at the upper portion of the stereoscopic image display, the extent to which the viewing range of the viewer is obscured by the black stripe patterns 165 becomes wider. Hence, the actually available viewing range (a) becomes much narrower than the viewing range (a') of the viewer, and this results in a significant luminance decrease.

Consequently, even if the black stripe patterns 165 are formed with a smaller area than that of the black matrix patterns 130 within the areas corresponding to the black matrix patterns 130, viewing angle differences between positions from which the stereoscopic image display is viewed cause a luminance drop at the upper and lower portion images but not at the center portion image, as shown in FIG. 7, and cause a luminance drop at the center and upper portion images but not at the lower portion image, as shown in FIG. 8.

Figure 9:
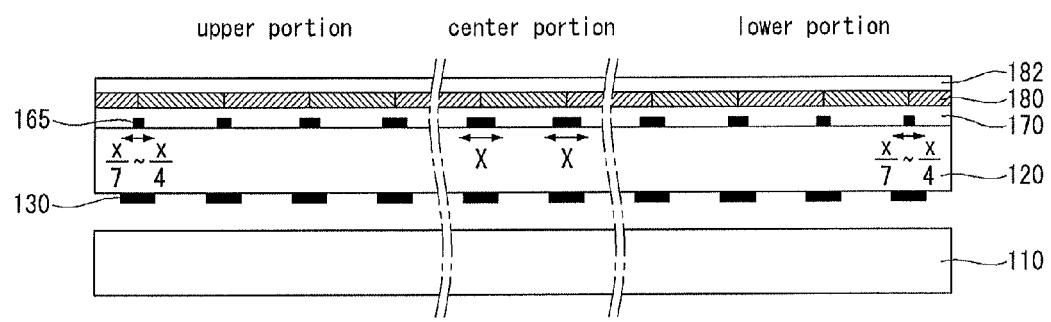
FIG. 9 is a view showing a polarization glasses type stereoscopic image display according to an exemplary embodiment of the present invention which is proposed to improve luminance uniformity.
Figure 10:
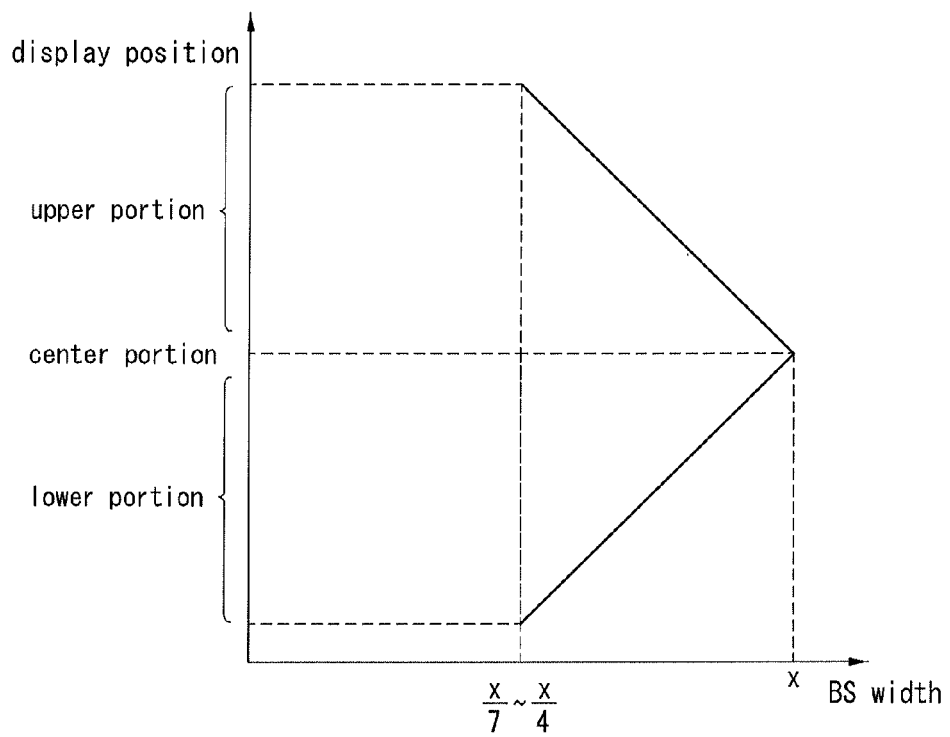
FIG. 10 is a view showing the width of black stripe patterns becoming gradually smaller from the center portion of the stereoscopic image display toward the upper and lower portions thereof.

FIG. 9 is a view showing a polarization glasses type stereoscopic image display according to an exemplary embodiment of the present invention which is proposed to improve luminance uniformity. FIG. 10 is a view showing the width of black stripe patterns becoming gradually smaller from the center portion of the stereoscopic image display toward the upper and lower portions thereof. In FIG. 10, the longitudinal axis indicates the display position, and the horizontal axis indicates the width of the black stripe patterns.

FIG. 9 has a substantially identical configuration to that shown in FIGS. 3 and 4, except that the width of the black stripe patterns 165 varies depending on the display position on the display panel.

Referring to FIG. 9, in the polarization glasses type stereoscopic image display according to an exemplary embodiment, the black stripe patterns 165 have a different width depending on the display position in order to solve the problem of decrease in luminance uniformity depending on the viewing angle of each position. In an exemplary embodiment of FIG. 9, the width of the black stripe patterns 165 is the largest at the center portion of the display panel, and becomes smaller from the center portion of the display panel toward the upper and lower portions thereof.

As shown in FIG. 10, assuming that the width of the black stripe patterns 165 positioned at the center portion of the display panel is "X", the width of the black stripe patterns 165 may gradually decrease toward the upper and lower portions of the display panel and become "X/7~X/4" at the outermost sides of the upper and lower portions. For example, if the width of the black stripe patterns 165 positioned at the center portion of the display panel is about 50 μm, the width of the black stripe patterns 165 positioned at the outermost sides of the upper and lower portions of the display panel may range from about 7.1 μm to 12.5 μm.

By varying the width of the black stripe patterns 165 depending on the display position, even if the viewer sees the upper and lower portions of the stereoscopic image display, in such a position as shown in FIG. 7, the extent to which the viewing range of the viewer is obscured by the black stripe patterns 165 becomes narrower, thereby minimizing luminance drops at the upper and lower portions. As a result, the problem of decrease in luminance uniformity depending on the viewing angle of each position can be solved.

As a typical viewer watches a display image in such a position (seated position) as shown in FIG. 7, FIGS. 9 and 10 illustrate only a luminance uniformity solution for this position. However, the present invention is not limited thereto. Although not specifically shown, in the present invention, the width of the black stripe patterns 165 may be the largest at the lower portion of the display panel and become gradually smaller from the lower portion of the display panel toward the upper portion thereof, in case of the viewer watching a display image, with his or her eyes set parallel to the lower portion of the stereoscopic image display (in a lying position), as shown in FIG. 8.

Figure 11:
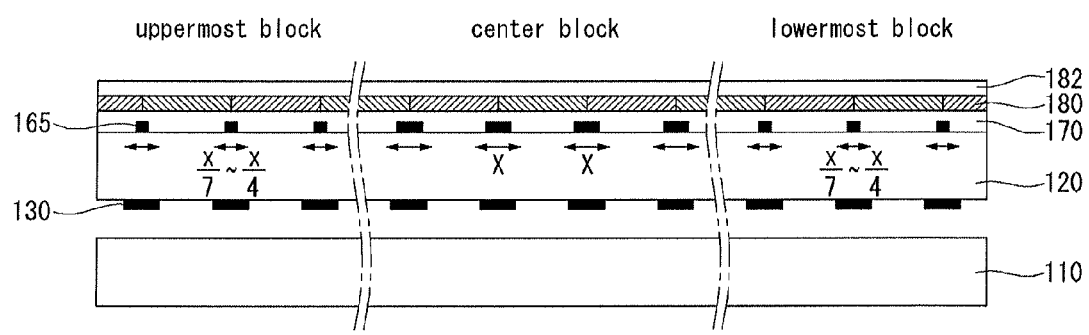
FIG. 11 is a view showing a polarization glasses type stereoscopic image display according to an exemplary embodiment of the present invention which is proposed to improve luminance uniformity.
Figure 12:
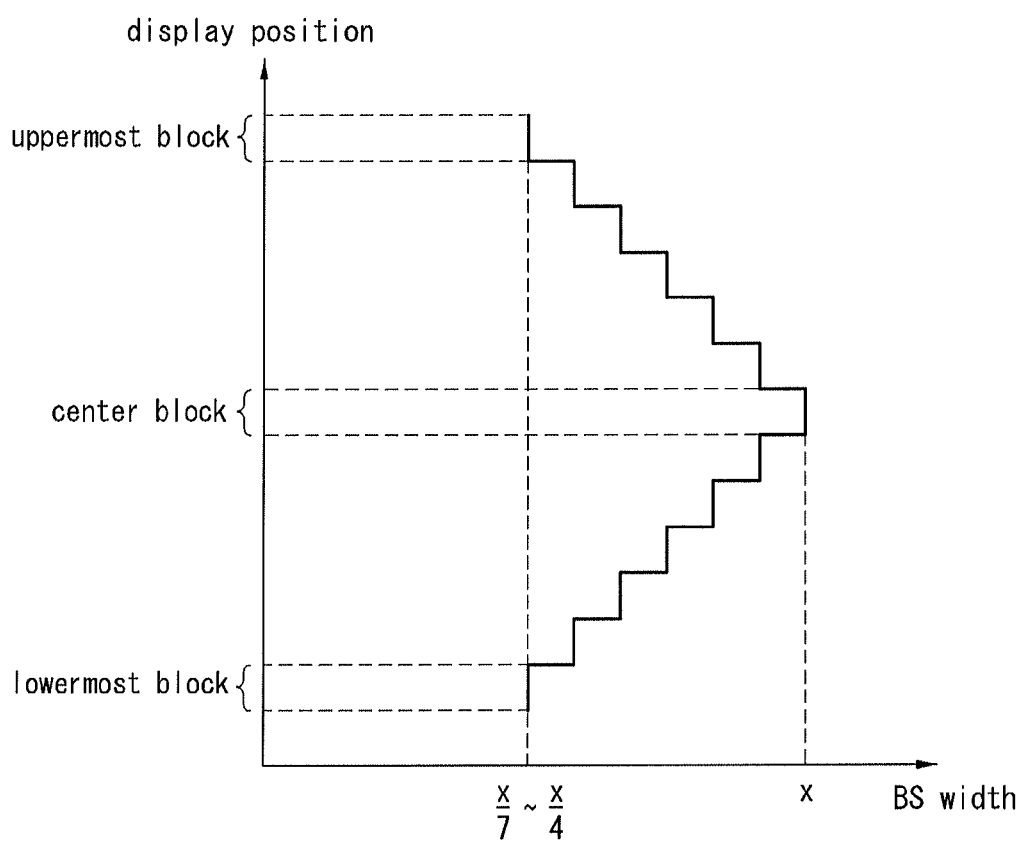
FIG. 12 is a view showing the width of the black stripe patterns becoming smaller in a stepwise manner from the center portion of the stereoscopic image display toward the upper and lower portions thereof.

FIG. 11 is a view showing a polarization glasses type stereoscopic image display according to an exemplary embodiment of the present invention which is proposed to improve luminance uniformity. FIG. 12 is a view showing the width of the black stripe patterns 165 becoming smaller in a stepwise manner from the center portion of the stereoscopic image display toward the upper and lower portions thereof.

FIG. 11 has a substantially identical configuration to that shown in FIG. 9, except that the width of the black stripe patterns 165 is varied every display block.

Referring to FIG. 11, in the polarization glasses type stereoscopic image display according to an exemplary embodiment of the present invention, the display panel is divided into a plurality of blocks along a perpendicular direction of the display plane, and the black stripe patterns 165 have a different width every display block, in order to widen vertical viewing angle and improve the problem of decreases in luminance uniformity depending on the viewing angle of each position. The width of the black stripe patterns 165 is the largest at the center block of the display panel, and becomes gradually smaller from the center block of the display panel toward the uppermost and lowermost blocks thereof. However, a plurality of black stripe patterns 165 neighboring in a perpendicular direction may be included in one block, and the black stripe patterns 165 in the same block have the same width.

As shown in FIG. 12, assuming that the width of the black stripe patterns 165 positioned at the center block of the display panel is "X", the width of the black stripe patterns 165 may gradually decrease in a stepwise manner toward the upper and lower portions of the display panel and become "X/7~X/4" at the uppermost and lowermost blocks.

Figure 13:
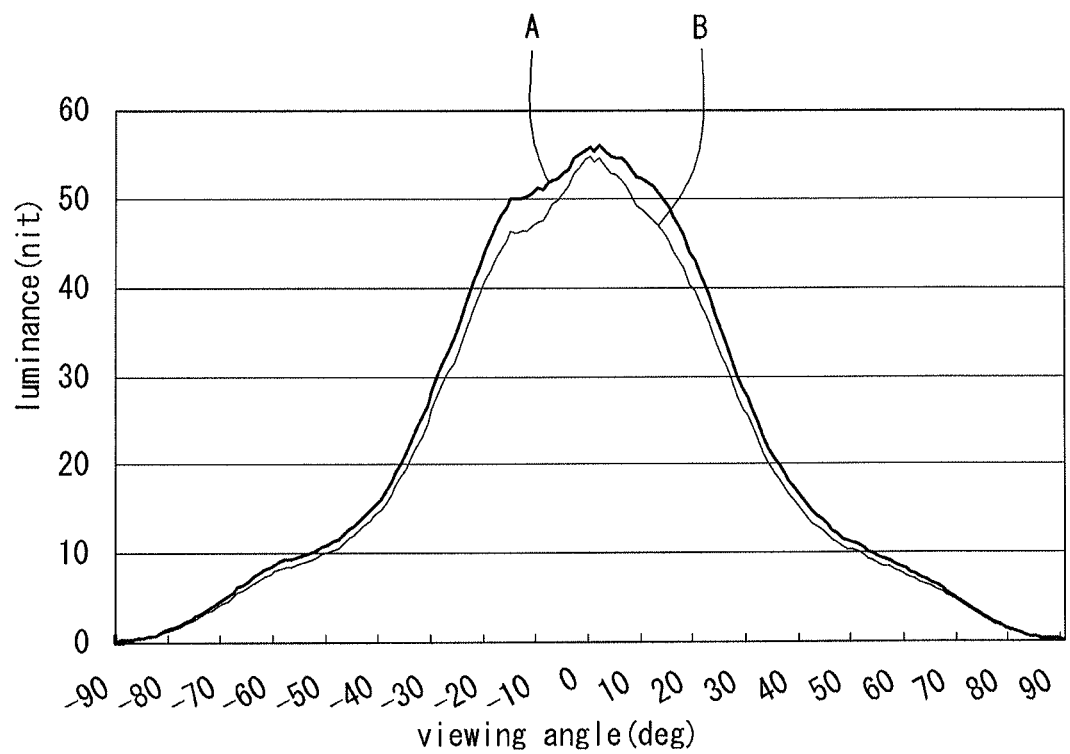
FIG. 13 is a view showing luminance measurement results according to FIGS. 9 to 12 in the present invention, in comparison to the luminance according to FIGS. 3 and 4.

FIG. 13 shows luminance measurement results according to FIGS. 9 to 12 in the present invention. For the measurement in the present invention, the width of the black stripe patterns is about 50 μm when the black stripe patterns are positioned at the center portion, and becomes smaller gradually or in a stepwise manner toward the upper and lower portions and becomes about 10 μm at the uppermost and lowermost sides.

Referring to FIG. 13, if the width of the black stripe patterns decreases by a constant fraction from the center portion of the display panel toward the upper and lower portions thereof, as shown in FIGS. 9 to 12, high luminance is achieved at the upper and lower portions of the display panel, as compared to the width of the black stripe patterns fixed to about 50 μm (see FIGS. 3 and 4), regardless of the display position. In FIG. 13, "A" represents the luminance of the upper and lower portions of the display panel in FIGS. 9 to 12, "B" indicates the luminance of the upper and lower portions of the display panel in FIGS. 3 and 4. As illustrated in FIG. 13, it is apparent that "A" is higher than "B".

Figure 14A:
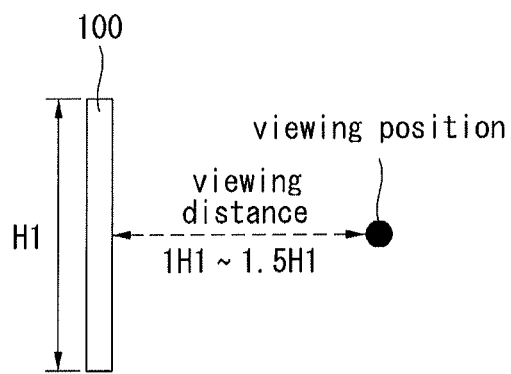
FIGS. 14*a* and 14*b* are views showing the appropriate viewing distance depending on the size of the stereoscopic image display.
Figure 14B:
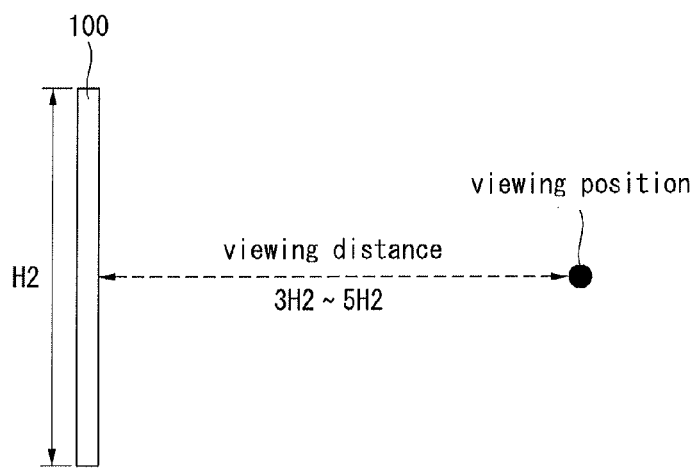

FIGS. 14a and 14b are views showing the appropriate viewing distance depending on the size of the stereoscopic image display.

In a small-sized model for a stereoscopic image display as shown in FIG. 14a, the appropriate viewing distance is relatively small, i.e., approximately 1 H1 to 1.5 H1. Here, "H1" indicates the vertical length (H1) of the small-sized image display 100. In varying the width of the black stripe patterns according to a position, vertical viewing angle, as well as appropriate viewing distance, should be taken in to account. A desired vertical viewing angle for the small-sized stereoscopic image display is relatively small, i.e., 12 to 15°. This type of small-sized model has a small viewing distance and requires a narrow vertical viewing angle, 3D crosstalk is not highly perceived even when the width of the black stripe patterns decreases at the upper and lower portions. Accordingly, the above-described configuration of FIGS. 9 and 12 of the present invention is effective for improving luminance uniformity of the small-sized model.

In a large-sized model for a stereoscopic image display as shown in FIG. 14b, the appropriate viewing distance is relatively small, i.e., approximately 3 H2 to 5 H2. Here, "H2" indicates the vertical length (H2) of the large-sized image display 100. A desired vertical viewing angle for the large-sized stereoscopic image display is relatively small, i.e., 20 to 26°. This type of large-sized model has a large viewing distance and requires a wide vertical viewing angle, 3D crosstalk may be highly perceived when the width of the black stripe patterns decreases at the upper and lower portions. Accordingly, for the large-sized model, it is more important to reduce 3D crosstalk at the upper and lower portions even if luminance uniformity is lowered to some degree.

Figure 15:
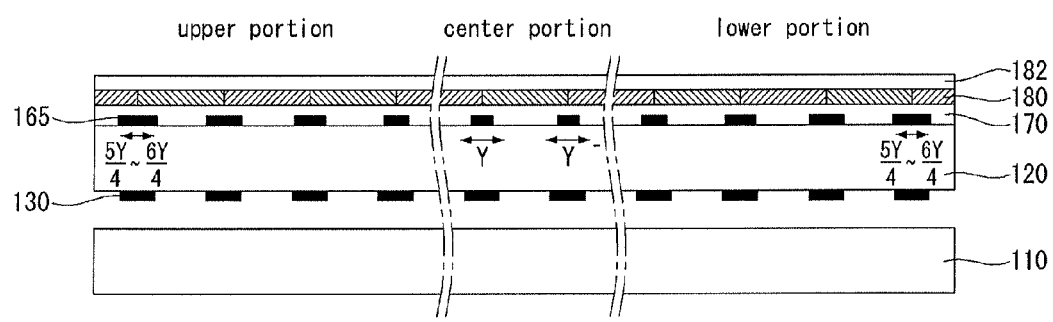
FIG. 15 is a view showing a polarization glasses type stereoscopic image display according to an exemplary embodiment of the present invention which is proposed to lessen 3D crosstalk.
Figure 16:
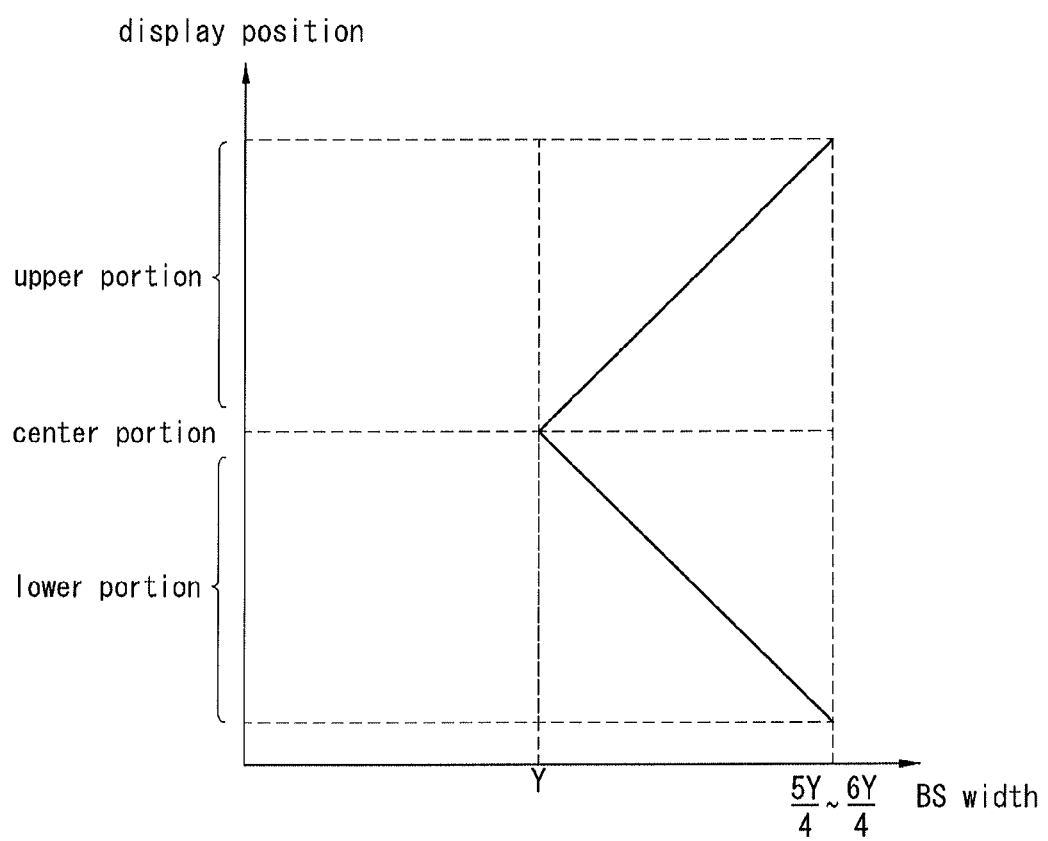
FIG. 16 is a view showing the width of the black stripe patterns becoming gradually larger from the center portion of the stereoscopic image display toward the upper and lower portions thereof.

FIG. 15 is a view showing a polarization glasses type stereoscopic image display according to an exemplary embodiment of the present invention which is proposed to lessen 3D crosstalk. FIG. 16 is a view showing the width of the black stripe patterns 165 becoming gradually larger from the center portion of the stereoscopic image display toward the upper and lower portions thereof.

Referring to FIG. 15, in the polarization glasses type stereoscopic image display according to an exemplary embodiment, the width of the black stripe patterns 165 gradually increases from the center portion toward the upper and lower portions in order to lessen 3D crosstalk at the upper and lower portions. In an exemplary embodiment of FIG. 15, the width of the black stripe patterns 165 is the smallest at the center portion of the display panel, and becomes gradually larger from the center portion of the display panel toward the upper and lower portions thereof.

As shown in FIG. 16, assuming that the width of the black stripe patterns positioned at the center portion of the display panel is "Y", the width of the black stripe patterns 165 may gradually increase toward the upper and lower portion of the display panel and become "5Y/4~6Y/4" at the outermost sides of the upper and lower portions. An exemplary embodiment of the present invention as shown in FIGS. 15 and 16 is effective at reducing 3D crosstalk in a large-sized model.

FIGS. 17 to 21 are views showing a polarization glasses type stereoscopic image display according to an exemplary embodiment of the present invention which is proposed to improve luminance uniformity and reduce 3D crosstalk. The following exemplary embodiment of the present invention is applicable to both small- and large-sized models.

Figure 17:
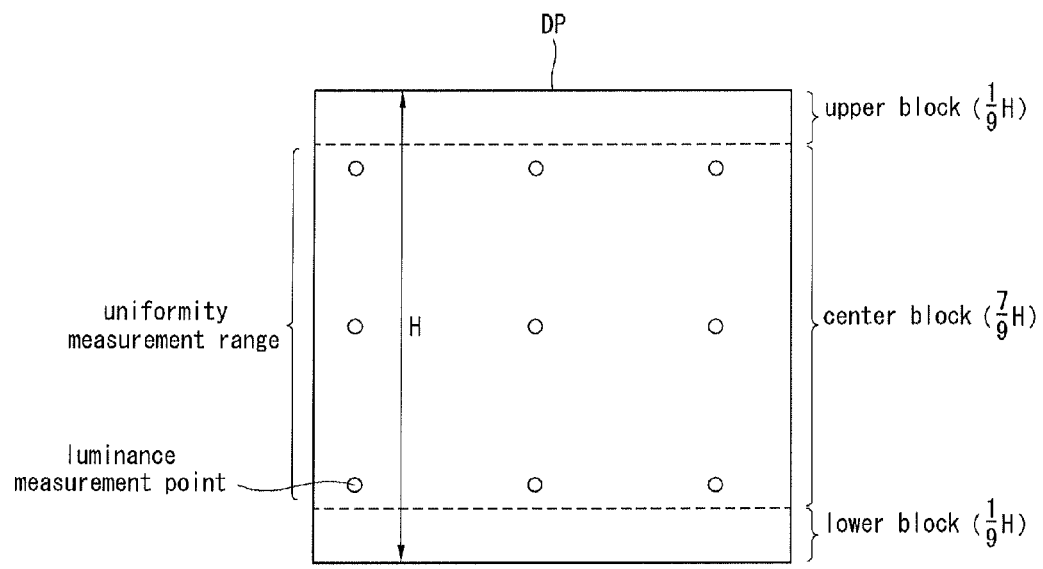
FIGS. 17 to 21 are views showing a polarization glasses type stereoscopic image display according to an exemplary embodiment of the present invention which is proposed to improve luminance uniformity and reduce 3D crosstalk.

Referring to FIG. 17, in an exemplary embodiment of the present invention, the display panel DP is divided into three blocks. The three blocks comprise a center block comprising a plurality of luminance measurement points used to measure luminance uniformity, an upper block disposed over the center block, and a lower block disposed under the center block. The center block may have a larger area than the upper and lower blocks. Provided that the vertical length of the display panel DP is "H", the vertical length of the center block may be 7H/9, and the vertical lengths of the upper and lower blocks may be 1H/9, respectively. The center block corresponds to a luminance uniformity measurement range. The upper block and the lower block may have the same area or different areas.

An exemplary embodiment of the present invention has the advantage of improving luminance uniformity and suppressing 3D crosstalk by forming the black stripe patterns 165 to have a uniform width at the center block occupying a relatively large area and have a gradually varying width at the upper and lower blocks occupying a relatively small area.

Figure 18:
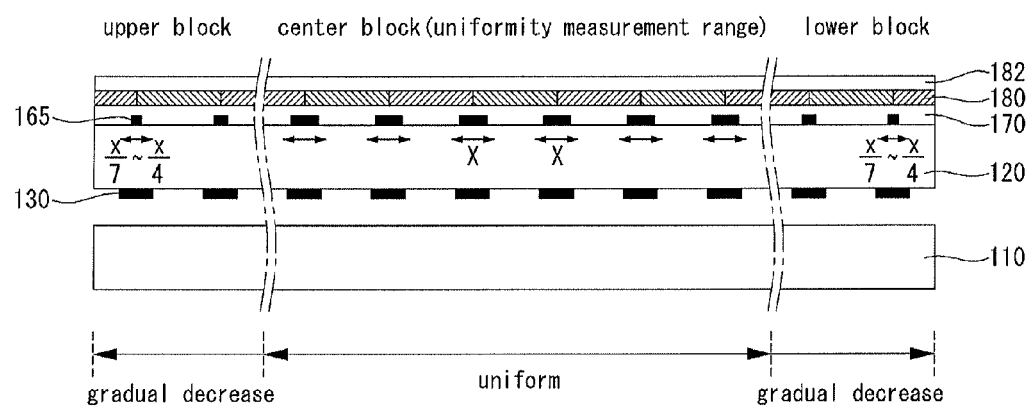
Figure 19:
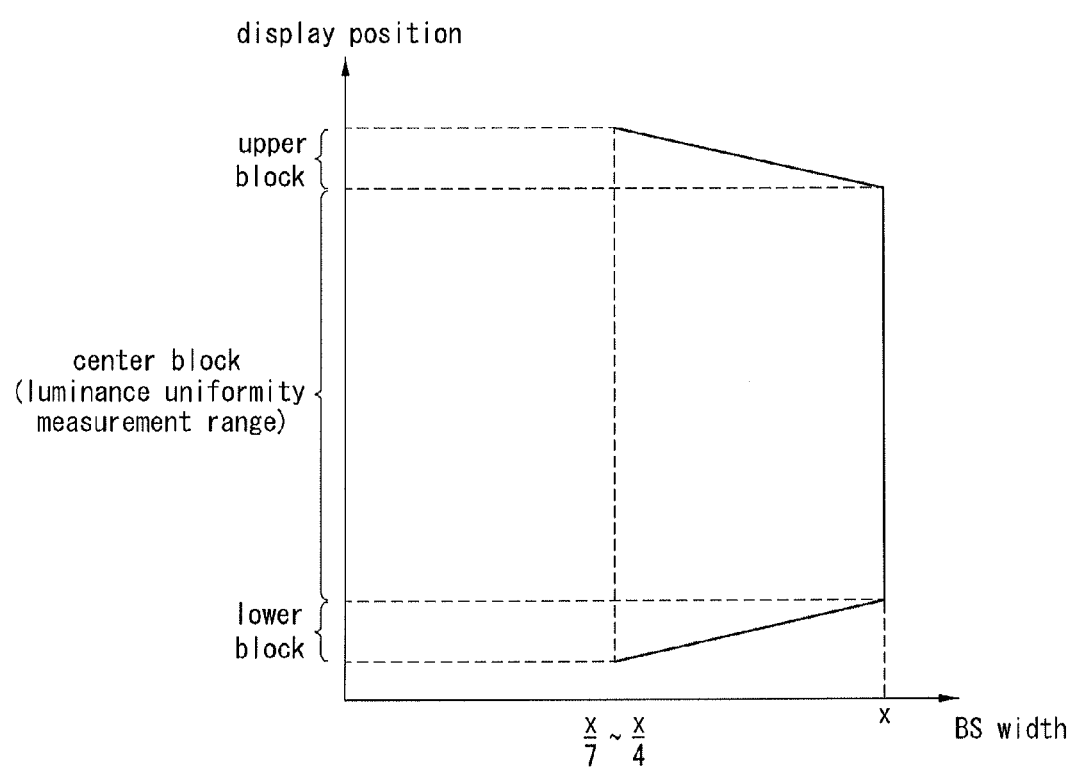

In an exemplary embodiment of the present invention, as shown in FIGS. 18 and 19, the black stripe patterns 165 may be formed to have a uniform width at the center block and have a gradually decreasing width toward the outermost sides the display panel at the upper and lower blocks. With this configuration, 3D crosstalk can be minimized.

Figure 20:
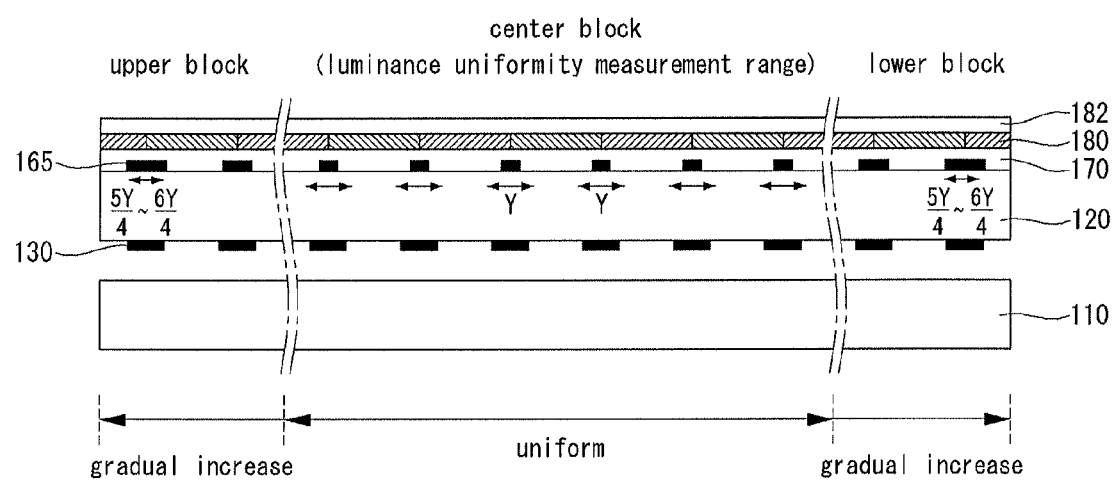
Figure 21:
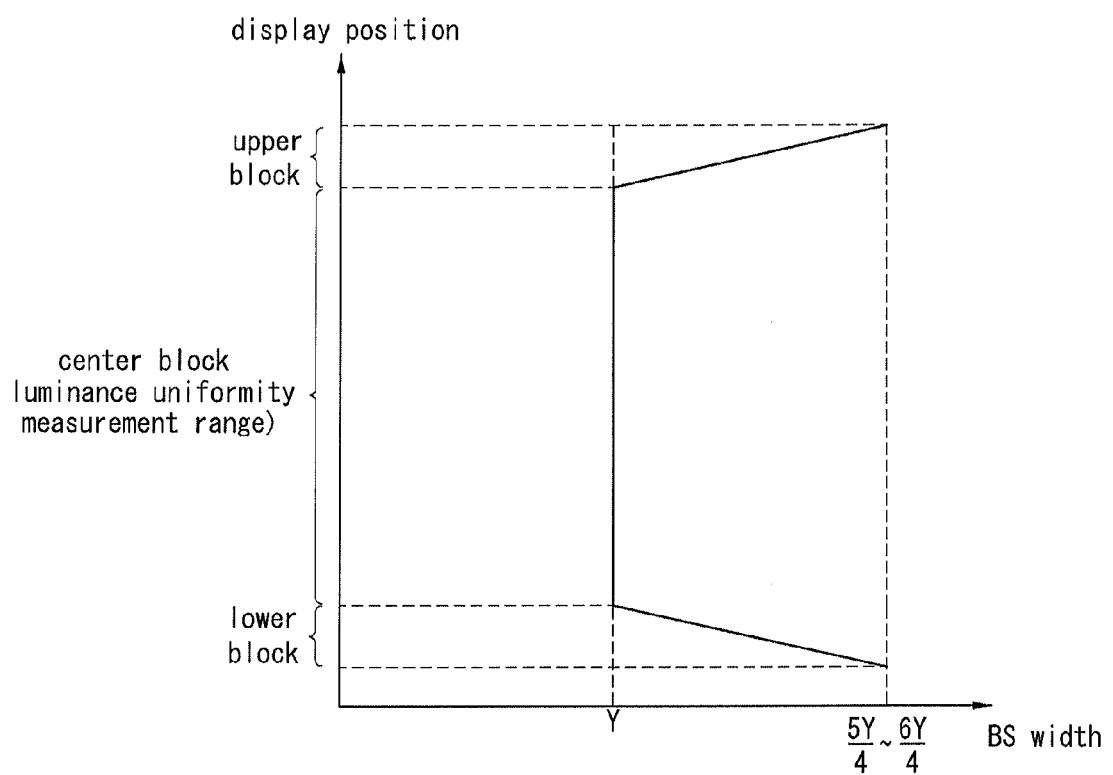

In an exemplary embodiment of the present invention, as shown in FIGS. 20 and 21, the black stripe patterns 165 may be formed to have a uniform width at the center block and have a gradually increasing width toward the outermost sides of the display panel at the upper and lower blocks. With this configuration, decreases in luminance uniformity can be minimized.

The foregoing exemplary embodiments showed that because the black stripe pattern and the black matrix pattern corresponding to each other completely overlap each other, the black stripe pattern and the black matrix pattern are aligned in the direction parallel to each other irrespective of the viewing position. However, the black stripe pattern and the black matrix pattern corresponding to each other may partially overlap each other at the upper and lower portions of the display panel and may be obliquely aligned with each other toward the center portion of the display panel, i.e., the viewing position, so as to secure the desired vertical viewing angle and to improve the luminance uniformity.

Figure 22:
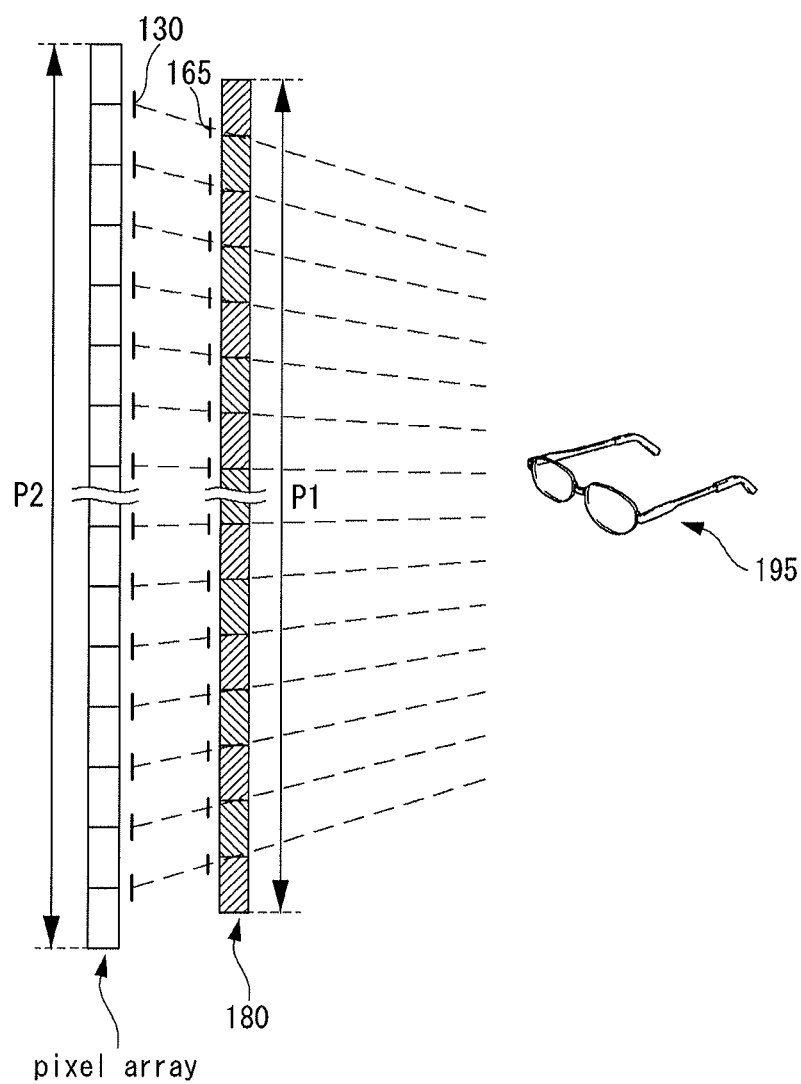
FIG. 22 is a view showing an example of black stripe patterns and black matrix patterns obliquely aligned toward the center portion of the display panel.
Figure 23:
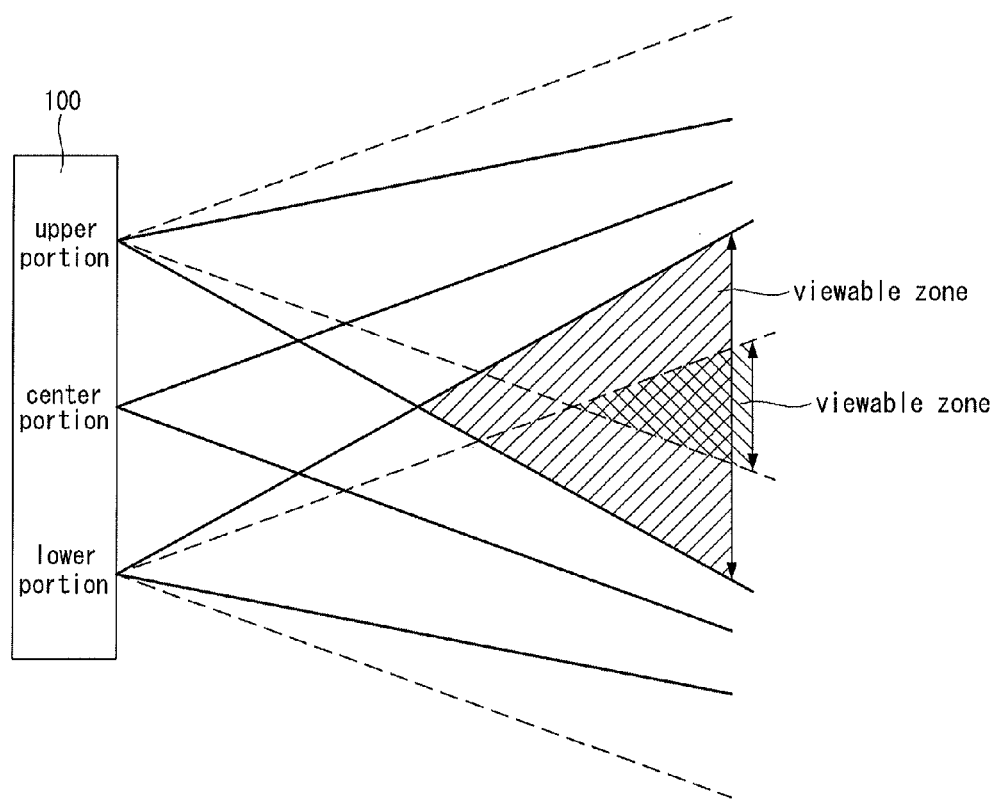
FIG. 23 is a view showing the viewable range which is widened at the center portion of the display panel according to FIG. 22.

FIG. 22 is a view showing an example of black stripe patterns and black matrix patterns obliquely aligned toward the center portion of the display panel. As shown in FIG. 22, black stripe patterns are aligned with the black matrix patterns so that they are directed to the viewing position, i.e., the center portion of the display panel. FIG. 23 is a view showing the viewable range which is widened at the center portion of the display panel according to FIG. 22.

Referring to FIG. 22, the vertical pitch of the patterned retarder 180 is less than that of a pixel array in the display surface. In other words, the overall vertical pitch P1 of the patterned retarder 180 may be designed to be less than the overall vertical pitch P2 of a pixel array in order to widen the viewable range with respect to the center portion of the display panel. In the center position of the display surface, the black stripe pattern and the black matrix pattern corresponding to each other are arranged to be substantially overlapped, preferably to be completely overlapped. In this state, when the viewing position is set to the center portion of the display panel and the patterned retarder 180 and the pixel array are aligned with each other based on the center portion therebetween, the black stripe pattern 165 and the black matrix pattern 130 are obliquely aligned with each another toward the center portion of the display panel, i.e., the viewing position at the upper and lower portions of the display panel. An overlap width between the black stripe pattern 165 and the black matrix pattern 130 in the center portion of the display panel is greater than an overlap width between the black stripe pattern 165 and the black matrix pattern 130 in the upper and lower portions of the display panel. The overlap width refers to an overlap width vertical to the display panel or the display surface. The overlap width between the black stripe pattern 165 and the black matrix pattern 130 may decrease as they go from the center portion of the display panel to the upper and lower portions of the display panel.

A viewable zone provided by the above-described differential pitch design and oblique alignment corresponds to an overlapping part among three solid line zones shown in FIG. 23. Here, the viewable zone indicates the zone in which an image of the stereoscopic image display 100 is displayed while having a 3D crosstalk value of 10% or less, regardless of the display position. Meanwhile, a viewable zone provided by equal pitch design (P1=P2) corresponds to an overlapping part among dotted line zones shown in FIG. 23. As is clear thorough FIG. 23, the viewable zone provided by the differential pitch design is much wider than the viewable zone provided by the equal pitch design. Once the viewable zone is widened, this improves luminance uniformity and lessening 3D crosstalk.

FIGS. 24 to 28 concern an exemplary embodiment of the present invention which provides differential pitch design and oblique alignment to improve luminance uniformity and lessen 3D crosstalk. With this configuration illustrated in FIGS. 24 to 28, the present invention makes it possible to improve luminance uniformity regardless of panel size and panel resolution and widen the viewable range with respect to the center portion of the display panel to a desired level.

Figure 24:
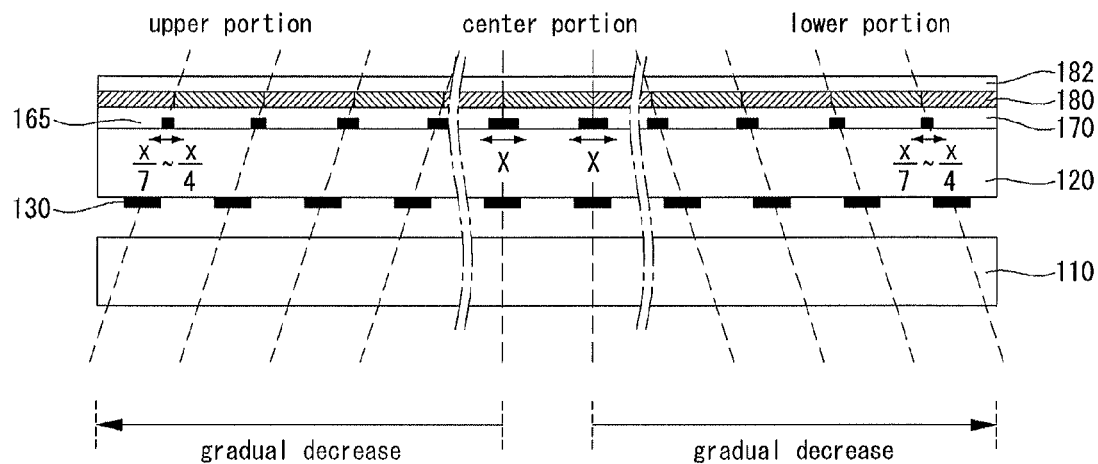
FIGS. 24 to 26 are views showing a polarization glasses type stereoscopic image display of the present invention to which differential pitch design and oblique alignment configuration is applied to FIGS. 9, 11, and 15.
Figure 25:
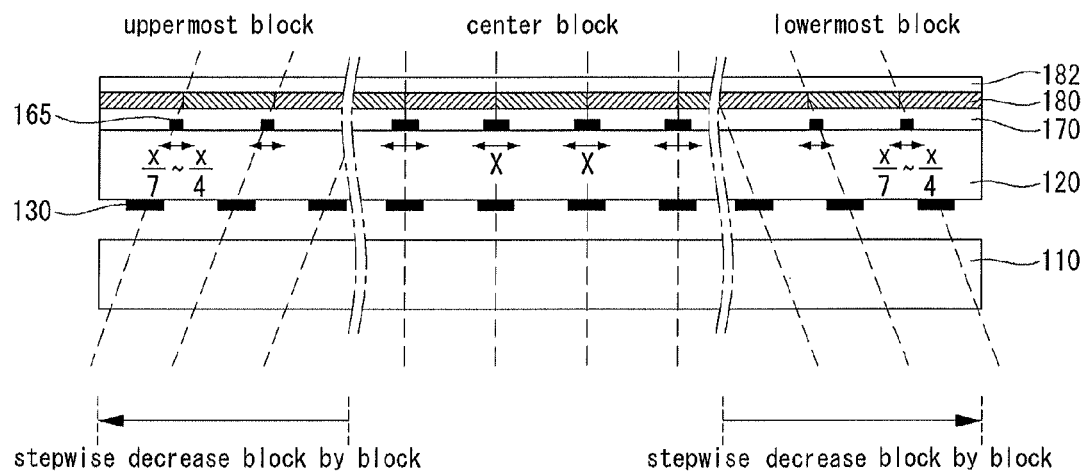

FIGS. 24 and 25 are views showing the polarization glasses type stereoscopic image display of the present invention to which the differential pitch design and the oblique alignment configuration is applied to FIGS. 9 and 11.

Referring to FIG. 24, in the polarization glasses type stereoscopic image display according to an exemplary embodiment, the black stripe patterns 165 have a different width depending on the display position in order to solve the problem of decrease in luminance uniformity depending on the viewing angle of each position. In the exemplary embodiment of FIG. 24, the width of the black stripe patterns 165 is the largest at the center portion of the display panel, and becomes smaller from the center portion of the display panel toward the upper and lower portions thereof. As shown in FIG. 24, assuming that the width of the black stripe patterns 165 positioned at the center portion of the display panel is "X", the width of the black stripe patterns 165 may gradually decrease toward the upper and lower portions of the display panel and become "X/7~X/4" at the outermost sides of the upper and lower portions.

As shown in FIG. 24, the black stripe patterns 165 and the black matrix patterns 130 are obliquely aligned with each another toward the center portion of the display panel, i.e., the viewing position at the upper and lower portions of the display panel, so as to widen the viewable zone, improve the luminance uniformity, and reduce the 3D crosstalk. Because of the alignment configuration illustrated in FIG. 24, the overlap width between the black stripe pattern 165 and the black matrix pattern 130 is the largest at the center portion of the display panel, and becomes smaller from the center portion of the display panel toward the upper and lower portions thereof.

Referring to FIG. 25, in the polarization glasses type stereoscopic image display according to an exemplary embodiment of the present invention, the display panel is divided into a plurality of blocks along a perpendicular direction of the display plane, and the black stripe patterns 165 have a different width every display block, in order to widen vertical viewing angle and improve the problem of decreases in luminance uniformity depending on the viewing angle of each position. The width of the black stripe patterns 165 is the largest at the center block of the display panel, and becomes gradually smaller from the center block of the display panel toward the uppermost and lowermost blocks thereof. However, a plurality of black stripe patterns 165 neighboring in a perpendicular direction may be included in one block, and the black stripe patterns 165 in the same block have the same width. As shown in FIG. 25, assuming that the width of the black stripe patterns 165 positioned at the center block of the display panel is "X", the width of the black stripe patterns 165 may gradually decrease in a stepwise manner toward the upper and lower portions of the display panel and become "X/7~X/4" at the uppermost and lowermost blocks.

Referring to FIG. 25, the black stripe patterns 165 and the black matrix patterns 130 are obliquely aligned with each another toward the center block of the display panel, i.e., the viewing position at the upper and lower blocks of the display panel, so as to widen the viewable zone, improve the luminance uniformity, and reduce the 3D crosstalk. Because of the alignment configuration illustrated in FIG. 25, the overlap width between the black stripe pattern 165 and the black matrix pattern 130 is the largest at the center block of the display panel, and becomes smaller from the center portion of the display panel toward the upper and lower blocks thereof.

Figure 26:
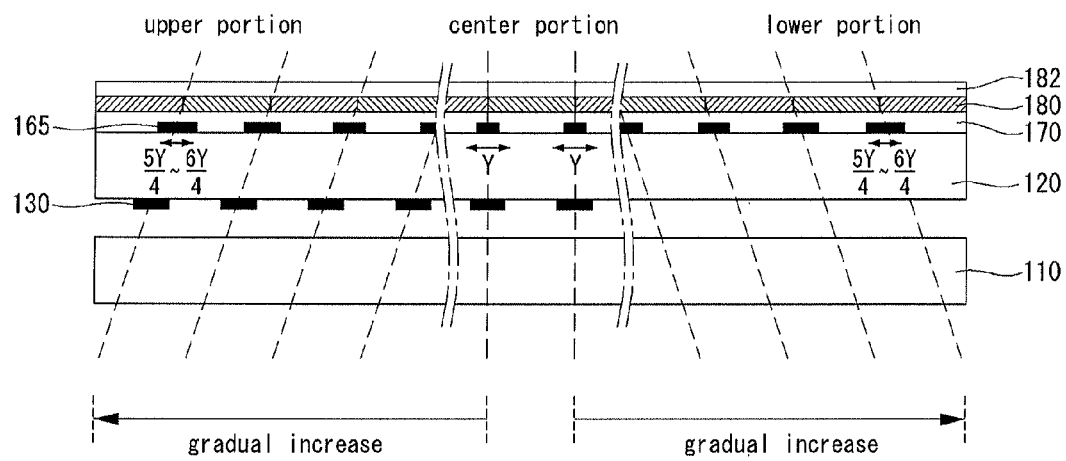

FIG. 26 is a view showing the polarization glasses type stereoscopic image display of the present invention to which the differential pitch design and the oblique alignment configuration is applied to FIG. 15.

Referring to FIG. 26, in the polarization glasses type stereoscopic image display according to an exemplary embodiment, the width of the black stripe patterns 165 gradually increases from the center portion toward the upper and lower portions in order to reduce 3D crosstalk at the upper and lower portions. In an exemplary embodiment of FIG. 25, the width of the black stripe patterns 165 is the smallest at the center portion of the display panel, and becomes gradually larger from the center portion of the display panel toward the upper and lower portions thereof. As shown in FIG. 26, assuming that the width of the black stripe patterns positioned at the center portion of the display panel is "Y", the width of the black stripe patterns 165 may gradually increase toward the upper and lower portion of the display panel and become "5Y/4~6Y/4" at the outermost sides of the upper and lower portions.

In the polarization glasses type stereoscopic image display shown in FIG. 26, the black stripe patterns 165 and the black matrix patterns 130 are obliquely aligned with each another toward the center portion of the display panel, i.e., the viewing position at the upper and lower portions of the display panel, so as to widen the viewable zone, improve the luminance uniformity, and reduce the 3D crosstalk. Because of the alignment configuration illustrated in FIG. 26, the overlap width between the black stripe pattern 165 and the black matrix pattern 130 is the largest at the center block of the display panel, and becomes smaller from the center portion of the display panel toward the upper and lower blocks thereof.

Figure 27:
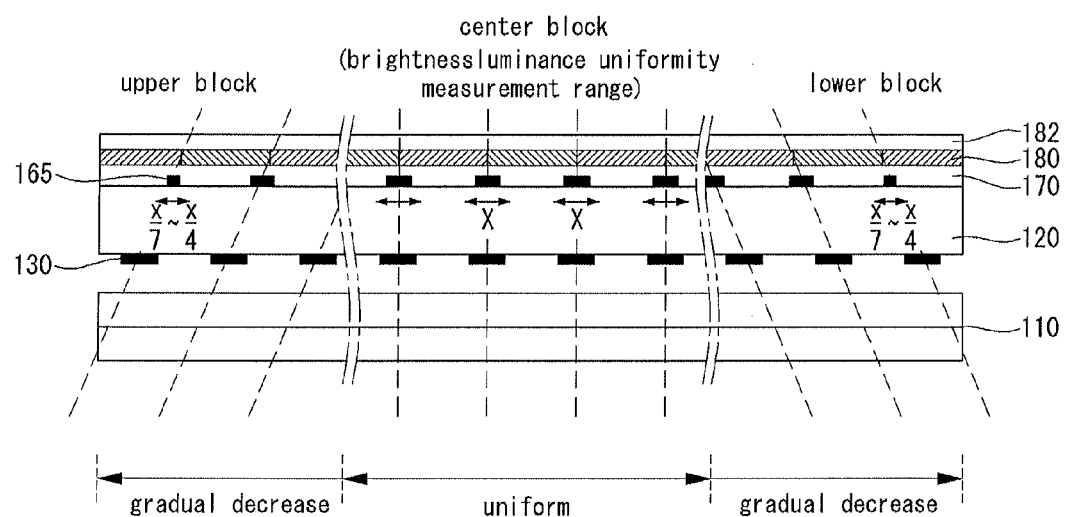
FIGS. 27 and 28 are views showing a polarization glasses type stereoscopic image display of the present invention to which differential pitch design and oblique alignment configuration is applied to FIGS. 18 and 20.
Figure 28:
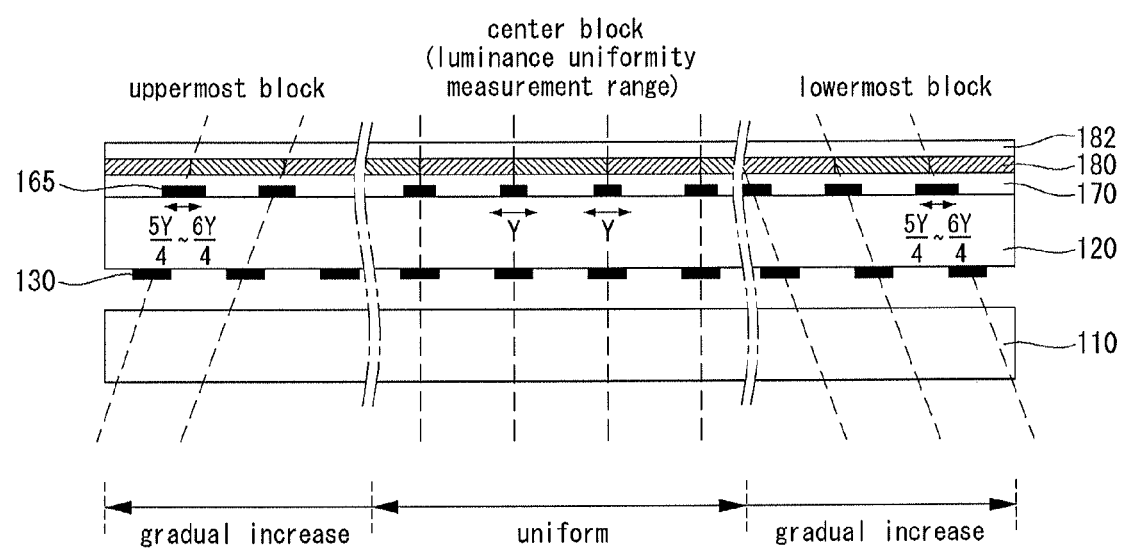

FIGS. 27 and 28 are views showing the polarization glasses type stereoscopic image display of the present invention to which differential pitch design and oblique alignment configuration is applied to FIGS. 18 and 20.

Referring to FIGS. 27 and 28, in the polarization glasses type stereoscopic image display according to an exemplary embodiment, the display panel is divided into three blocks (i.e., the upper block, the center block, and the lower block) along the vertical direction, so as to improve the luminance uniformity and reduce the 3D crosstalk. The width of the black stripe patterns 165 positioned at the center block of the display panel is uniform, and the width of the black stripe patterns 165 positioned at the upper and lower blocks of the display panel may gradually change. The center block may have a first area, and the upper and lower blocks may have a second area smaller than the first area.

As shown in FIG. 27, the width of the black stripe patterns 165 positioned at the center block of the display panel is set to the uniform width "X". The width of the black stripe patterns 165 may gradually decrease toward the upper and lower blocks of the display panel and may become "X/7~X/4" at the uppermost and lowermost blocks. The generation of the 3D crosstalk may be minimized because of the above-described configuration.

In the polarization glasses type stereoscopic image display shown in FIG. 27, the black stripe patterns 165 and the black matrix patterns 130 are obliquely aligned with each another toward the center block of the display panel, i.e., the viewing position at the upper and lower blocks of the display panel, so as to widen the viewable zone, improve the luminance uniformity, and reduce the 3D crosstalk. Because of the alignment configuration illustrated in FIG. 27, the overlap width between the black stripe pattern 165 and the black matrix pattern 130 is the largest at the center block of the display panel, and becomes smaller from the center portion of the display panel toward the upper and lower blocks thereof.

As shown in FIG. 28, the width of the black stripe patterns positioned at the center block of the display panel is set to the uniform width "Y". The width of the black stripe patterns 165 at each of the upper and lower blocks of the display panel may gradually increase and become "5Y/4~6Y/4" at the outermost sides of the upper and lower blocks. According to the above-described configuration, the luminance uniformity may be improved.

In the polarization glasses type stereoscopic image display shown in FIG. 28, the black stripe patterns 165 and the black matrix patterns 130 are obliquely aligned with each another toward the center block of the display panel, i.e., the viewing position at the upper and lower blocks of the display panel, so as to widen the viewable zone, improve the luminance uniformity, and reduce the 3D crosstalk. Because of the alignment configuration illustrated in FIG. 27, the overlap width between the black stripe pattern 165 and the black matrix pattern 130 is the largest at the center block of the display panel, and becomes smaller from the center portion of the display panel toward the upper and lower blocks thereof.

As discussed above, the polarization glasses type stereoscopic image display according to the present invention makes it possible to decrease the width of the black matrix patterns, compared to the related art, for minimizing decreases in aperture ratio and luminance and to realize the same vertical viewing angle as the related art, by forming the black matrix patterns and the black stripe patterns so as to correspond to both sides of the color filter substrate opposite to each other.

Moreover, the present invention contributes to widening vertical viewing angle and diminishing decreases in luminance uniformity depending on the viewing angle of each position, by varying the width of the black stripe patterns according to a display position.

Furthermore, the present invention contributes to improving luminance uniformity regardless of panel size and resolution and widening the viewable range with respect to the center portion of the display panel to a desired level, by designing the overall vertical pitch of the patterned retarder to be less than the overall vertical pitch of the pixel array and obliquely aligning the black stripe patterns and the black matrix patterns from the upper and lower portions of the display panel toward the center portion corresponding to the viewing position.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A polarization glasses type stereoscopic image display displaying a stereoscopic image on a display surface comprising:
    a thin film transistor array substrate;
    a color filter array substrate having a plurality of black matrix patterns on a first plane facing the thin film transistor array substrate;
    a plurality of black stripe patterns that are aligned correspondingly to the black matrix patterns on a second plane of the color filter array substrate facing the first plane; and
    a patterned retarder disposed over the second plane of the color filter array substrate,
    wherein the vertical pitch of the patterned retarder is less than the vertical pitch of a pixel array formed on the display surface, and
    wherein, when the display surface is divided into an upper portion, a center portion, and a lower portion along a first direction from an upper side of the display surface to a lower side of the display surface, widths of the black stripe patterns gradually vary at least at the upper and lower portions of the display surface.

2. The polarization glasses type stereoscopic image display of claim 1,
    wherein the black stripe pattern and the black matrix pattern corresponding to each other overlap each other at a viewing position in the center portion of the display surface, and
    wherein the black stripe pattern and the black matrix pattern corresponding to each other partially overlap each other in the upper and lower portions of the display surface and are obliquely aligned at the viewing position.

3. The polarization glasses type stereoscopic image display of claim 2,
    wherein an overlap width between the black stripe pattern and the black matrix pattern corresponding to each other in the center portion of the display surface is greater than an overlap width between the black stripe pattern and the black matrix pattern in the upper and lower portions of the display surface, and
    wherein the overlap width is vertical to the display panel.

4. The polarization glasses type stereoscopic image display of claim 3,
    wherein a width of each of the black stripe patterns gradually decreases as it goes from the center portion of the display surface to the upper and lower portions of the display surface.

5. The polarization glasses type stereoscopic image display of claim 3,
    wherein each of the upper portion, the center portion, and the lower portion of the display surface is divided into a plurality of blocks along the first direction,
    wherein the width of the black stripe patterns is varied every block.

6. The polarization glasses type stereoscopic image display of claim 5,
    wherein the width of the black stripe patterns decreases in a stepwise manner from the center block of the display surface toward the uppermost and lowermost blocks.

7. The polarization glasses type stereoscopic image display of claim 5,
    wherein each of the blocks includes a plurality of black stripe patterns, and the black stripe patterns belonging to the same block have the same width.

8. The polarization glasses type stereoscopic image display of claim 3,
    wherein a width of the black stripe patterns gradually increases from the center portion of the display surface toward the upper and lower portions of the display surface.

9. The polarization glasses type stereoscopic image display of claim 3,
    wherein the center portion of the display panel is selected as a center block having a first area, the upper portion of the display panel is selected as an upper block which is disposed over the center block and has a second area, and the lower portion of the display panel is selected as a lower block, which is disposed under the center block and has a third area,
    wherein the width of the black stripe patterns is uniform at the center block and gradually varies at the upper and lower blocks.

10. The polarization glasses type stereoscopic image display of claim 9,
    wherein, at each of the upper and lower blocks, the width of the black stripe patterns gradually decreases as it approaches the outermost black stripe pattern.

11. The polarization glasses type stereoscopic image display of claim 9,
    wherein, at each of the upper and lower blocks, the width of the black stripe patterns gradually increases as it approaches the outermost black stripe pattern.

12. The polarization glasses type stereoscopic image display of claim 9,
    wherein a size of the first area is greater than sizes of the second area and the third area.

13. The polarization glasses type stereoscopic image display of claim 9,
    wherein a size of the second area is substantially equal to a size of the third area.

* * * * *